United States Patent Office 3,522,275
Patented July 28, 1970

3,522,275
PROCESS FOR PRODUCING PHENOLS AND XANTHENES
Arnold Factor, Scotia, Herman L. Finkbeiner, Schenectady, Robert A. Jerussi, Scotia, and Dwain M. White, Schenectady, N.Y., assignors to General Electric Company, a corporation of New York
No Drawing. Filed Aug. 11, 1967, Ser. No. 659,881
Int. Cl. C07c 39/12
U.S. Cl. 260—335
11 Claims

ABSTRACT OF THE DISCLOSURE

Substituted diphenyl ethers are heated to temperatures of from 200° C. to 450° C. in an inert atmosphere to undergo rearrangement to yield phenols and xanthenes. The yield of the xanthenes are increased by the addition of an oxidizing agent to the reaction. The phenols are useful in the production of polyphenylene oxides, polyesters, polycarbonates, etc., which are useful in producing films, fibers, molded products and the like.

In accordance with the process of the instant invention, a substituted diphenyl ether of the formula (I)
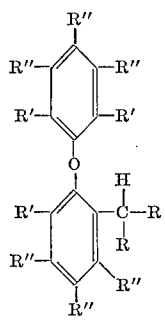

wherein R is hydrogen or a monovalent hydrocarbon group of the class consisting of alkyl groups, alkaryl groups, aralkyl groups and aryl groups containing from 1 to 18 or more carbon atoms, R' is hydrogen or a monovalent hydrocarbon radical containing from 1 to 18 or more carbon atoms and free of aliphatic unsaturation, or an alkoxy group containing from 1 to 18 or more carbon atoms, and R" is a member of the class consisting of hydrogen, hydroxyl, monovalent hydrocarbon radicals free of aliphatic unsaturation, containing from 1 to 18 or more carbon atoms and monovalent hydrocarbonoxy radicals free of aliphatic unsaturation containing from 1 to 18 or more carbon atoms, and wherein two adjacent R" groups or an adjacent R' and R" group can together represent the adjacent ring of a fused ring system, is placed in a reaction vessel in an inert atmosphere and the reaction vessel maintained at a temperature at which the phenyl ether spontaneously rearranges to yield a phenol of the formula (II)
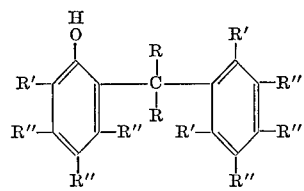

wherein R, R' and R" are as above defined and in those instances where at least one R' ortho to the ethereal oxygen is hydrogen in the benzene nucleus which does not contain the

group, xanthenes of the formula (III)
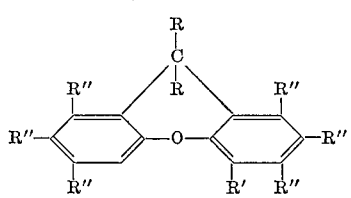

wherein R, R' and R" are as above defined. It is, of course, to be understood by those skilled in the art that in the above formulas the R, R' and R" group are each independently selected from the defined groups; that is to say that each R' need not necessarily represent the same entity throughout the molecule.

The temperature at which the process of the instant invention is conducted is not narrowly critical and can range from as low as 250° C. to 450° C. and higher. It is preferred, however, in order that the reaction time not be inordinately long, to employ temperatures in the range of from 300° C. to 450° C. or even higher. By employing temperatures in this latter range, side reactions are virtually nonexistent and the products are readily recovered.

In conducting the process of this invention, it is preferred to employ an inert atmosphere in order to avoid side reactions and obtain highest yields. Thus, the reaction can be conducted in a glass vessel by drawing a vacuum on the vessel and sealing the vessel and subsequently heating the vessel to the temperature of the reaction and conducting the reaction under autogenous pressure. An inert atmosphere can also be maintained by using nitrogen, helium, krypton, neon or any of the other inert gases, and operating the process at atmospheric or superatmospheric pressure.

It has also been found in conducting the process of this invention that the yield of the xanthene of Formula III can be greatly increased by adding to the reaction mixture an oxidizing agent such as sulfur, sulfur trioxide, sulfuric acid, manganese oxide, selenium oxide and the like. When an oxidizing agent is added, there is produced significant amounts of the phenol of Formula II; however, the yield of the xanthene of Formula III is increased. The amount of the oxidizing agent employed is not narrowly critical and can range from $\frac{1}{10}$ to 25 parts by weight of the oxidizing agent to 100 parts, by weight, of the starting diphenyl ether of Formula I.

Inasmuch as it is preferred to maintain the reactant in a liquid phase, the pressure at which the process of this invention is conducted will be determined by the vapor pressure of the particular material employed as the starting diphenyl ether. The pressure should be maintained at such a point so as to maintain the reactant in a liquid phase. Pressures from below one atmosphere to greater than 10 atmospheres can be employed; however, in most instances, it is desirable and preferred to employ autogenous pressure in the reaction system so that the reaction vessel ned not be of extra heavy construction.

Illustrative of the monovalent hydrocarbon radicals which R, R' and R" represent include alkyl radicals such as methyl, ethyl, isopropyl, tert-butyl, etc.; cycloalkyl radicals such as cyclopentyl, cyclohexyl, etc.; aryl radicals such as phenyl, xenyl, naphthyl, etc.; aralkyl radicals such as benzyl, beta-phenylethyl, beta-phenylpropyl, etc.; alkaryl radicals such as tolyl, xylyl, etc.

Illustrate of the alkoxy groups which R' and R" represent are, for example, methoxy, ethoxy, isopropoxy, butoxy, tertiary-butoxy, octyloxy, dodecyloxy, octadecyloxy, etc.

The oxidizing agents employed in the present inven-

EXAMPLE 2

A series of experiments were conducted in the procedure of Example 1 employing different starting materials to yield different benzylphenols. The starting material and the products and the yields are listed in the following table.

TABLE I

| Run No. | Starting Material (100 parts) | Temp., °C. | Hrs., Time | Product (Parts) | Recovered Starting Material (Parts) |
|---|---|---|---|---|---|
| 2 | 2-methyldiphenyl ether | 370 | 4 | 2-benzylphenol (12) | 87 |
| 3 | 2,2'-dimethyldiphenyl ether | 370 | 4 | 2-(2-methylbenzyl)phenol (40) | 50 |
| 4 | 2,2',6,6'-tetramethyldiphenyl ether | 370 | 21 | 2-methyl-6(2,6-dimethylbenzyl)-phenol (45) | 5 |
| 5 | 2-ethyldiphenyl ether | 370 | 19 | {2-(α-phenylethyl)phenol (30) / 2-(β-phenylethyl)phenol (30)} | 50 |
| 6 | 2-methyl-6-benzyldiphenyl either | 320 | 3 | 2-methyl-6-(diphenylmethyl)-phenol (50) | 10 |
| 7 | 2-methyl6-phenyldiphenyl ether | 370 | 18 | 2-phenyl-6-benzylphenol (50) | 40 |
| 8 | 2,6-dimethyl-4'-methoxydiphenyl ether | 370 | 3 | 2-methyl-6-(4-methoxybenzyl)-phenol (55) | 4 |
| 9 | 2,3',5',6-tetramethyl-4'-methoxydiphenyl ether | 370 | 18 | 2-methyl-6-(3,5-dimethyl-4-methoxybenzyl)phenol (50) | 10 |
| 10 | 2,3',5',6-tetramethyl-4'-hydroxydiphenyl ether | 370 | 4 | 2-methyl-6-(3,5-dimethyl-4-hydroxy benzyl)phenol (12) | 10 | tion, in order to increase the amount of the xanthene of Formula III produced, are preferably those which first give rise to a free radical-type initiator and subsequently react to form carbonium ions. Such oxidizing agents are, for example, sulfur, sulfur trioxide, sulfuric acid, vanadium pentoxide, cupric oxide, selenium, selenium oxide, manganese oxide, and the like.

Illustrative of the starting material of Formula I which can be employed in the process of the invention are: 2-benzyldiphenyl ether, 2-benzyl-4'-methyldiphenyl ether, 2-benzyl-4'-methoxydiphenyl ether, 2-benzyl-4'-phenyldiphenyl ether, 2-methyl-4'-methyldiphenyl ether, 2-methyl-4'-phenyldiphenyl ether, 2-methyl-3'-methyldiphenyl ether, 2-methyl-3'-phenyldiphenyl ether, 2,6-dimethyl-4-phenyldiphenyl ether, 2,4-dimethyldiphenyl ether, 2,4,6-trimethyldiphenyl ether, 2.2',4,4',6,6'-hexamethyldiphenyl ether, 2-methyl-3'-hydroxydiphenyl ether, 2-methyl-4'-methoxydiphenyl ether, 2-methyl - 3'-methoxydiphenyl ether, 2-methyl-4-methoxydiphenyl ether, 2-methyl-4-phenoxydiphenyl ether, 2,6-dimethyl-4-phenoxydiphenyl ether,

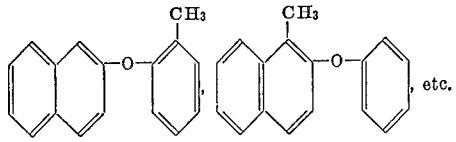, etc.

These phenyl ethers can readily be prepared by the Ullmann ether sythesis. For example, 2-methyl-3'-methyldiphenyl ether can be prepared by reacting the potassium salt of ortho-cresol with meta-bromotoluene in the presence of cuprous bromide, employing dimethylformamide as the solvent.

The phenols produced in accordance with the process of this invention find utility as starting materials in the production of polyphenylene oxides in accordance with the process described in U.S. Pat. 3,306,874 and 3,306,875, issued Feb. 28, 1967 and assigned to the same assignee as the present invention, to produce polyphenylene oxide polymers which are useful as molding compositions.

The following examples serve to further illustrate the invention. All parts are parts by weight unless otherwise expressly stated.

EXAMPLE 1

2,6-dimethyldiphenyl ether (100 parts) was charged into a thick wall Pyrex reaction tube. The tube was then sealed under vacuum and heated to 370° C. in an electric furnace for 23 hours. The tube was cooled to room temperature, opened and the contents analyzed by vapor-phase chromatography and nuclear magnetic resonance spectrometry and was found to contain 2-methyl-6-benzylphenol (70 parts), 4-methyl xanthene (5 parts) and 2,6-dimethyldiphenyl ether (25 parts).

The 2-methyl-6-(diphenylmethyl)-phenol produced was a solid having a melting point of 77°–79° C. The trimethylsilyl derivative of the compound was prepared by reaction of the hydroxyl group with bis(trimethylsilyl) acetamide and has a melting point of 104°–105° C. Both the 2-phenyl-6-benzyl phenol and its silyl derivative were analyzed and gave an excellent correlation with theoretical as shown in the following:

2-phenyl-6-benzyl phenol.—Calculated (percent): C, 87.5; H, 6.6. Found (percent): C, 87.1; H, 6.8.

Trimethylsilyl derivative.—Calculated (percent): C, 79.8; H, 7.6; Si, 8.1; M.W., 346. Found (percent): C, 80.4; H, 7.6; Si, 8.4; M.W., 355.

Nuclear magnetic resonance spectral analysis and infrared analysis confirmed the structure of the 2-phenyl-6-benzyl phenol.

The 2-methyl-6-(4-methoxybenzyl)phenol produced was a liquid. Nuclear magnetic resonance spectral analysis (60 megacyles) confirmed the structure of the material showing peaks at 109 c.p.s., 191 c.p.s., 214 c.p.s., 300 c.p.s. and 370–410 c.p.s., compared to tetramethylsilane.

The 2-methyl-6-(3,5-dimethyl-4-methoxybenzy)phenol produced was liquid. Nuclear magnetic resonance spectral analysis confirmed the structure, showing peaks at 128, 130, 217, 225, 275 and 400–420 cycles per second on a 60 megacycle instrument using tetramethylsilane as a reference.

The 2-ethyl-6-(3,5-dimethyl-4-hydroxybenzyl)-phenol produced was a solid having a melting point of 88°–90° C. Ultraviolet and infrared analysis confirmed the structure. Nuclear magnetic resonance spectral analysis (60 megacycles) showed peaks of 116, 121.5, 216, 268, 394.5 and 399–403 cycles per second employing tetramethylsilane as a standard.

EXAMPLE 3

2,6-dimethyldiphenyl ether (100 parts) and sulfur (16 parts) were charged into a thick wall Pyrex reaction tube. The tube was then sealed under vacuum and heated to 370° C. in an electric furnace for 90 minutes. The tube was cooled to room temperature, and opened. The contents were analyzed and found to contain 2-methyl-6-benzylphenol (13 parts), 4-methyl-xanthene (36 parts) and 2,6-dimethyl-diphenyl ether (25 parts).

It will, of course, be apparent to those skilled in the art that modification other than those set forth in the above examples can be employed in the process of this invention without departing from the scope thereof.

The xanthenes produced in accordance with the process of the invention can be oxidized by molecular oxygen, manganese dioxide or selenium dioxide, to yield xanthones. The xanthones can then be treated with the alkali metal hydroxide to yield hydroxybenzophenones which are useful as ultra violet screening agents for plastic materials such as polyethylene, polyvinylchloride, etc.

What we claim as new and desire to secure by Letters Patent of the United States is:

1. A process which comprises heating to a temperature of from about 250° C. to about 450° C. a substituted diphenyl ether of the formula,

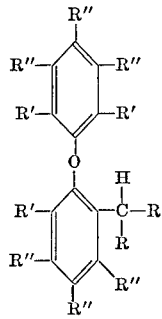

wherein R, R' and R" are hydrogen or a monovalent hydrocarbon group selected from the class consisting of alkyl, alkaryl, aralkyl and aryl groups, R' is in addition alkoxy, and R" is in addition hydroxyl or a monovalent hydrocarbonoxy radical and wherein two adjacent R" groups or an adjacent R' and R" group can together represent the adjacent ring of a fused ring system.

2. A process as claimed in claim 1 wherein the diphenyl ether has the formula

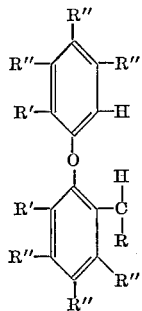

wherein R, R' and R" are hydrogen or a monovalent hydrocarbon group free of aliphatic unsaturation, R' is in addition alkoxy and R" is in addition hydroxyl, or a monovalent hydrocarbonoxy radical, and there is produced a substituted diphenyl methane of the formula

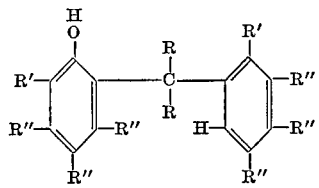

and xanthenes of the formula

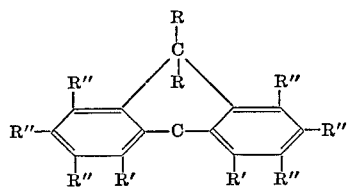

wherein R, R' and R" have the above-identified meanings.

3. A process as claimed in claim 1 wherein the temperature is from about 300° C. to about 450° C.

4. A process as claimed in claim 1 wherein an oxidizing agent is added to the diphenyl ether.

5. A process as claimed in claim 4 wherein the oxidizing agent is sulfur.

6. A process as claimed in claim 1, wherein the diphenyl ether has the formula

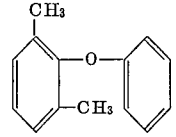

7. A process as claimed in claim 1, wherein the diphenyl ether has the formula

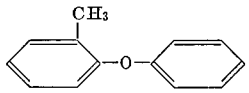

8. A process as claimed in claim 1, wherein the diphenyl ether has the formula

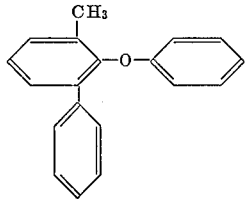

9. A process as claimed in claim 1, wherein the diphenyl ether has the formula

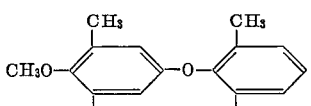

10. A process as claimed in claim 1, wherein the diphenyl ether has the formula

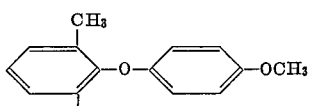

11. A process as claimed in claim 1, wherein the diphenyl ether has the formula

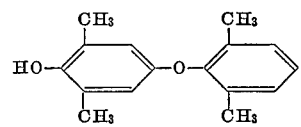

References Cited

UNITED STATES PATENTS

| | | | |
|---|---|---|---|
| 3,183,273 | 5/1965 | Spacht et al. | 260—619 |
| 2,900,362 | 8/1959 | Spacht et al. | 260—619 X |
| 2,967,853 | 1/1961 | Spacht et al. | 260—619 X |

FOREIGN PATENTS 906,655 9/1962 Great Britain.

NORMA S. MILESTONE, Primary Examiner

U.S. Cl. X.R.

260—619

UNITED STATES PATENT OFFICE
CERTIFICATE OF CORRECTION

Patent No. 3,522,275      Dated July 28, 1970

Inventor(s) Arnold Factor, Herman L. Finkbeiner, Robert A. Jerussi and Dwain M. White It is certified that error appears in the above-identified patent and that said Letters Patent are hereby corrected as shown below:

Column 5, lines 28-41, cancel the formula and substitute

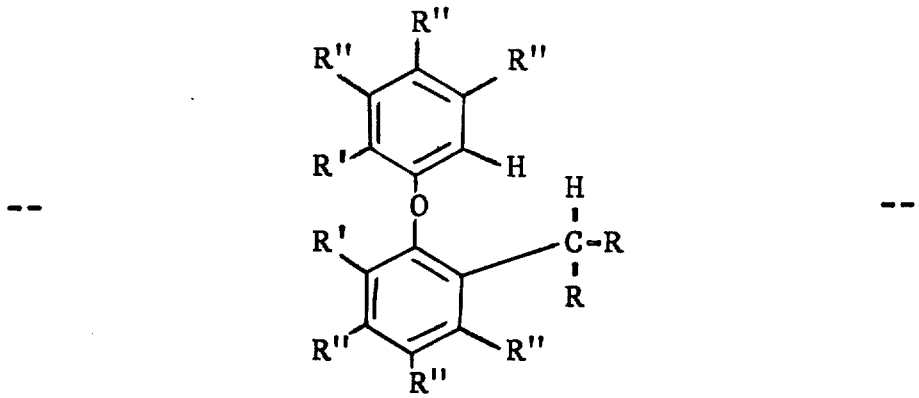

Column 5, lines 56-63, cancel the formula and substitute

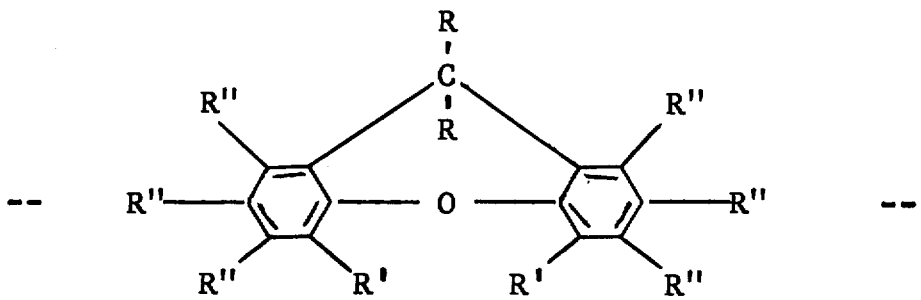

SIGNED AND SEALED
NOV 3 1970

NOV. 3, 1970

(SEAL)
Attest:

Edward M. Fletcher, Jr.
Attesting Officer

WILLIAM E. SCHUYLER, JR.
Commissioner of Patents